United States Patent
Maier et al.

[11] Patent Number: 6,125,208
[45] Date of Patent: *Sep. 26, 2000

[54] WRITING RECOGNITION UNIT

[75] Inventors: Udo Maier, Wildberg; Werner Ruppert, Schoenaich, both of Germany

[73] Assignee: International Business Machines Corp., Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/704,565

[22] PCT Filed: Mar. 8, 1995

[86] PCT No.: PCT/EP95/00857

§ 371 Date: Sep. 10, 1996

§ 102(e) Date: Sep. 10, 1996

[87] PCT Pub. No.: WO95/24693

PCT Pub. Date: Sep. 14, 1993

[30] Foreign Application Priority Data

Mar. 10, 1994 [DE] Germany .............. 44 07 998

[51] Int. Cl.$^7$ .................................. G06K 9/62
[52] U.S. Cl. .............. 382/228; 382/309; 706/52
[58] Field of Search .................. 382/187, 209, 382/213, 215, 216, 219, 226, 227, 228; 395/76

[56] References Cited

U.S. PATENT DOCUMENTS

| | | | |
|---|---|---|---|
| 5,189,728 | 2/1993 | Yamakawa et al. | 395/76 |
| 5,257,323 | 10/1993 | Melen et al. | 382/228 |
| 5,455,872 | 10/1995 | Bradley | 382/228 |
| 5,544,279 | 8/1996 | Li et al. | 382/228 |

FOREIGN PATENT DOCUMENTS

| | | | |
|---|---|---|---|
| 663 664 A1 | 1/1994 | European Pat. Off. | G06K 9/68 |
| 63-263588 | 10/1988 | Japan . | |
| 5-12493 | 1/1993 | Japan . | |
| WO 91/17521 | 5/1991 | WIPO | G06K 9/68 |
| WO 93/20533 | 3/1992 | WIPO | G06K 9/68 |

OTHER PUBLICATIONS

Proc. Tencon '93 IEEE Region 10 Conf. on Computer, Communication, Control and Power Engineering, vol. 2 of 5, Oct. 19–21, 1993, Beijing.
Using Fuzy Logic, Jun Yan et al. pp. 54–55, 1994.
C. Hong et al, "Hierarchical Control Structure for Multi-sensor Object Recongition System", IEEE Tencon'93 pp. 811–814.
J.M. Keller et al, "Information fusion via fuzzy logic in automatic target recognition", Proc. of the SPIE—The International Soc. for Optical Engineering., 20th AIPR Workshop 1992, vol. 1623 pp. 203–208.

*Primary Examiner*—Amelia Au
*Assistant Examiner*—Samir Ahmed
*Attorney, Agent, or Firm*—F. Chau & Associates, LLP

[57] ABSTRACT

An apparatus and method for recognizing written characters. In one aspect, a method for recognizing written characters comprises the steps of: recognizing written characters with each of a plurality of writing recognition units, each of the writing recognition units supplying reliability values for each recognized character; determining a confidence level for each of the written characters from the corresponding reliability value for the written characters; testing the agreement of the results from the writing recognition units for each of the recognized characters; evaluating a plurality of rules for each of the recognized character with the corresponding levels and agreements; and delivering the overall result of the writing recognition process.

15 Claims, 4 Drawing Sheets

CONFIDENCE 1 = 75
CONFIDENCE 2 = 60
RECO OUTPUT NEQ

WRITING RECOGNITION UNIT

BACKGROUND OF THE INVENTION

The invention relates to a device for recognising characters in a document with at least two writing recognition units, an evaluation device for evaluating the results of the writing recognition units with the aid of a database of rules for evaluating the sample recognised by the writing recognition units. The invention also relates to a process for the recognition of characters which makes use of the device.

The recognition of character samples or written symbols is an ever important task in the modern business world. Data processing installations with character recognition units are used, particularly in the banking area and in other finance for reading remittance orders, cheque forms and other documents without the help of manual input.

There are in particular two character or writing recognition methods known in the Federal Republic which are on the market. The Computer Gesellschaft Konstanz mbH (CGK) process is marketed under the type reference "CSL 2610". AEG Elektrocom GmbH Erkennungssysteme has developed the "Polyform" character recognition software. This software is employed in the AEG readers and in equipment from other companies.

The two methods are based on different writing recognition algorithms and they can therefore be described as "orthogonal" to one another. This difference in the algorithm employed leads to the result that the two methods give different results for the same text. This variation in results is particularly noticeable in the case of handwritten text since the characters in such texts are often written very quickly and not clearly.

In order to improve the reliability of the writing recognition, tests have been carried out with a so-called "multi-voting" method where the results of reading of the same characters from several writing recognition units are supplied to an arbitration unit. The arbitration unit, as currently used, compares the results and frequently selects the overall result from the writing recognition process in accordance with the following rules:

1) If all writing recognition units come to the same result, then the result is trivial, i.e. the total result will be selected from any desired writing recognition unit.
2) If none of the writing recognition units supplies a satisfactory result, the overall result is "reject" (not recognisable).
3) If the results of all writing recognition units are the same, at least one of which has a reliability value greater than a fixed threshold value (e.g. 50%), the most reliable value is selected as the overall result.
4) If the results of all writing recognition units are unequal, the overall result is "reject" (not recognisable).

The "multi-voting" method only slightly improves the reliability of the writing recognition process compared with the conventional method. However, it requires the use of at least two writing recognition units which each use a different recognition algorithm. This is considerably more costly in terms of licence fees and the cost-benefit relationship is dubious.

SUMMARY OF THE INVENTION

The object of the invention is therefore to develop an improved writing recognition method which derives more benefit from the use of several writing recognition units.

This object is achieved in accordance with the invention through a calculating means for calculating a confidence level for each of the samples recognised by the writing recognition units and a sample vector memory component for storing the confidence level, where the credibilities are accessible to the evaluating means in the operating condition. With the aid of the calculated credibilities, the principles of "fuzzy logic" or the teachings of uncertain quantities are employed for evaluating the results of the plurality of writing recognition units. Simulations have shown that the reliability of the writing recognition method in accordance with the teaching of the invention is improved by 57% compared with the known conventional "multi-voting" method.

In a further embodiment of the invention the device contains a degree of fulfilment table for storing the results of the rules and the degree to which they are met. The degree of fulfilment is used in order to select the result of the rule which most satisfactorily represents the result of the writing recognition process. An output means for searching the degree of fulfilment table is used in order to establish the result of the rule with the highest degree of fulfilment.

The object is further achieved by a process for recognition of symbols on a document. This process comprises the following steps:

A first step for the recognition of the written character with the aid of at least two writing recognition units and the provision of reliability values;

a second step for determining the confidence level for the character, a third step for testing the agreement of the results from the different writing recognition units, a fourth step for evaluating rules with the aid of the credibilities and agreements and a fifth step for supplying the overall result of the writing recognition process.

In the preferred embodiment of the invention, the process makes use of the device in accordance with the invention. However, other devices may be employed.

In a further embodiment of the invention, a degree of fulfilment is calculated for each rule in the fourth step and in the fifth step the result of the rule with the highest degree of fulfilment will be supplied as the overall result. The degree of fulfilment of the rule is the lowest confidence level of the values employed in evaluating the rules.

Only the result with the highest reliability from each writing recognition unit is employed in using the process. It would be possible, however, to use other recognition alternatives with correspondingly lower reliability values.

DETAILED DESCRIPTION OF PREFERRED EMBODIMENTS

Figure 1:
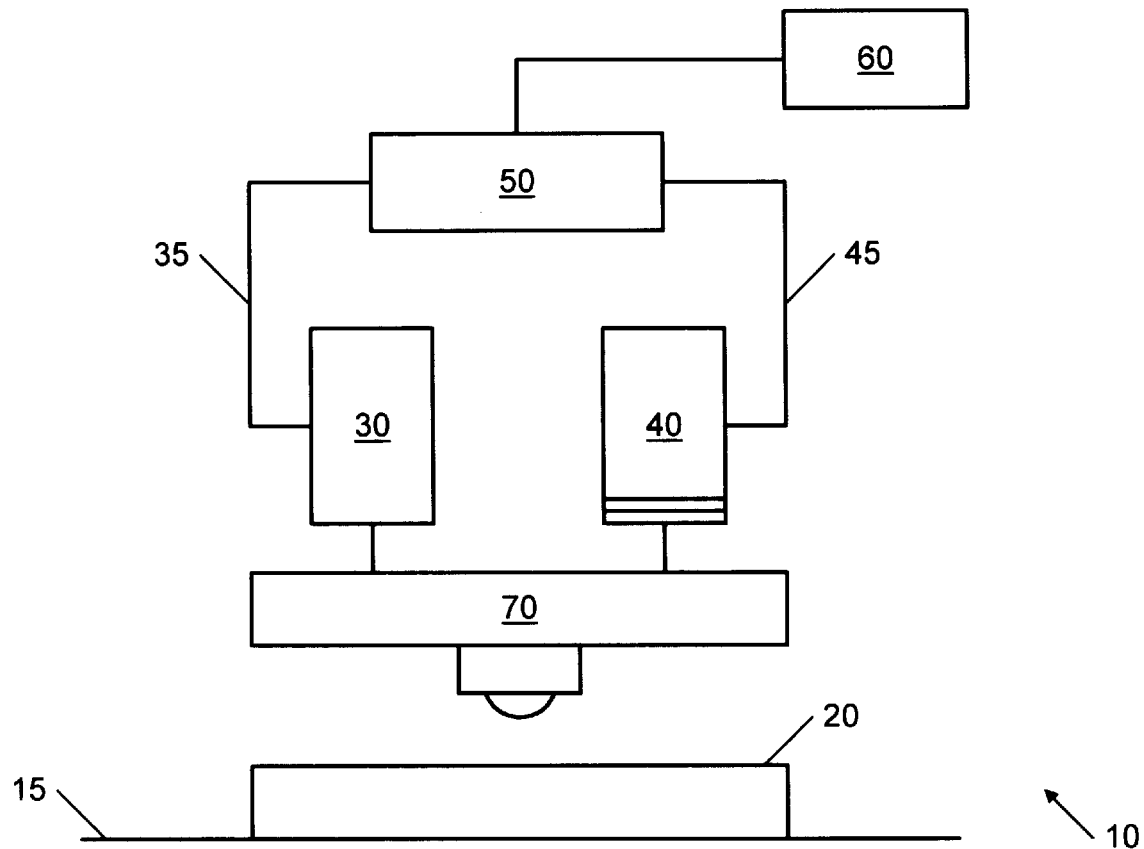
FIG. 1 shows a diagram of a device in accordance with the invention.

FIG. 1 shows the device 10 in accordance with the invention. A document 20 is placed on a scanning device 15. The document 20 is a credit transfer form, a cheque blank, a debit entry or another piece of writing. The document 20 contains written characters or character samples which have to be recognised by the device 10.

The device 10 contains an optical scanning unit 70 which converts the document 20 into an electronic image which is offered to the writing recognition units 30, 40.

The device 10 also contains a first writing recognition unit 30 and a second writing recognition unit 40. The first and second writing recognition units 30 and 40 are preferably two different writing recognition units each employing a different writing recognition algorithm. There may, however, be as many as desired. The first writing recognition unit 30 can e.g. employ the algorithm developed by AEG and the second writing recognition unit 40 can use the algorithm developed by the computer company Konstanz. The writing recognition units 30, 40 deliver their results to a processor 50 by means of signal leads 35, 45. The processor 50 processes the results from the two writing recognition units 30, 40 to decode the text written on the document 20 and stores the decoded text in part of the memory 60.

Figure 2:
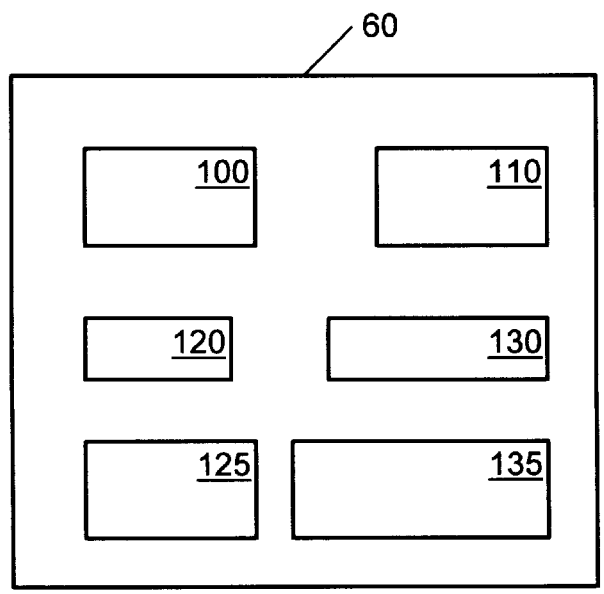
FIG. 2 is a diagram of the memory of the device in accordance with the invention.

The memory 60 is divided into different parts which are shown in FIG. 2. All the results of the writing recognition units 30, 40 are first stored in a character sample storage part 100. Rules which are employed for the process in accordance with the invention are stored in a rules data base 110. A sample vector storage part 120 contains data on the confidence level of the character recognised. In a rule result storage part 125 are stored the results of the evaluation of the sample vector with the aid of the rules data base 110. A degree of fulfilment table 135 stores the degree of fulfilment of the rule. In the final result storage part 130 the result of the character recognition process is stored in coded form, e.g. in the form of ASCII codes or other machine-readable symbols.

Figure 3:
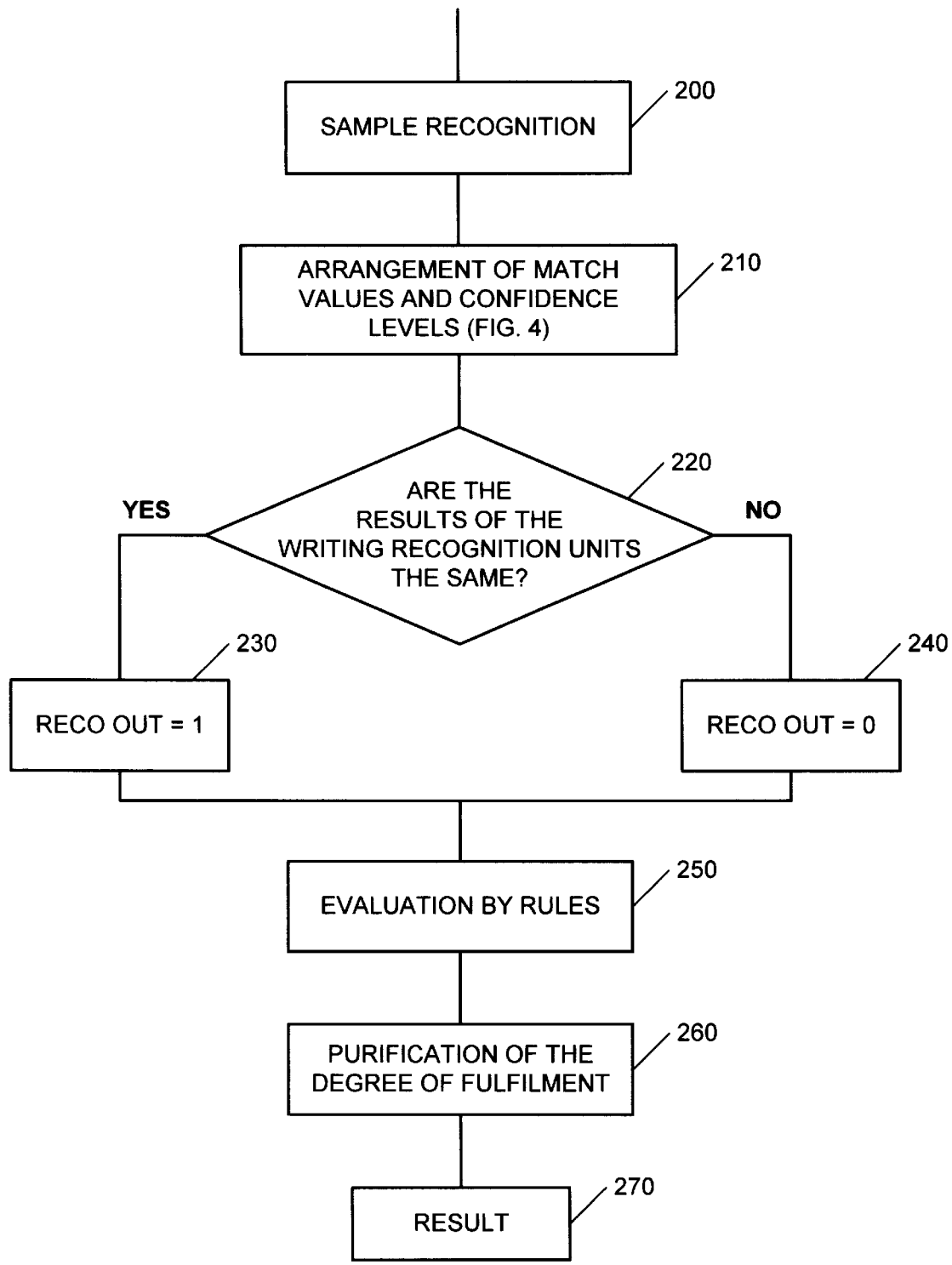
FIG. 3 is a flow chart of the process in accordance with the invention.

FIG. 3 shows a flow diagram of the writing recognition process in accordance with the invention. In step 200, the text on the document 20 is recognised character by character, i.e. the character recognition units 30, 40 investigate each individual character sample on the document 20. For each character sample the writing recognition units 30, 40 supply to the processor 50 not only the recognised symbols, but also the reliability value for each character recognised. The characters and their reliability values are placed in the character sample memory part 100.

For each separate sample on the document, the writing recognition units 30, 40 produce several possible alternative symbols for an individual character sample, together with a corresponding reliability value. In the preferred embodiment of the invention, only the candidate characters with the highest reliability value are taken and stored in the character sample storage part 100. Further candidate symbols could likewise be stored and processed in accordance with the invention.

Figure 5:
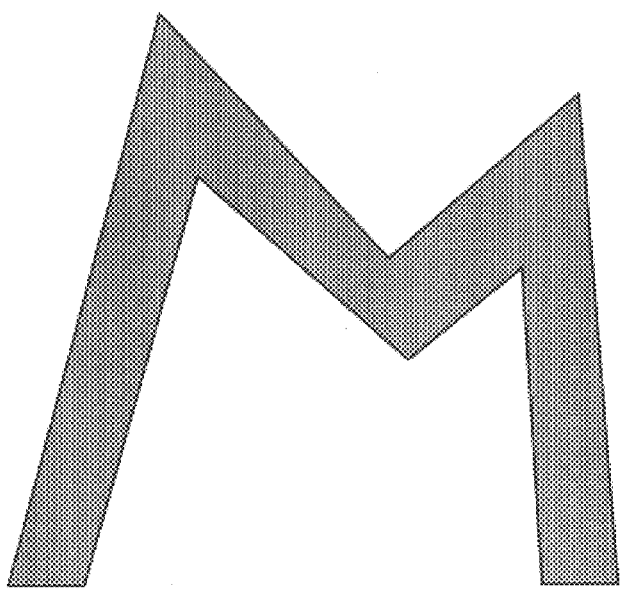
FIG. 5 is an example of a character sample to be recognised.

The example shown in FIG. 5 will serve as an example for step 200. To the human eye, this character sample is clearly the letter "M". The writing recognition units 30, 40 recognise in the character sample, however, several candidate characters. All the possible variants of the sample are thus supplied to the processor 50 together with the corresponding reliability values. Since each writing recognition unit 30, 40 functions according to a different algorithm, different reliability values are produced for the characters recognised.

One of the writing recognition units 30, 40 recognises in the character sample of FIG. 2 wither the letter "M" (reliability value: 80%) or the letter "N" (reliability value: 50%). The other of the writing recognition units 30, 40 does not recognise only the letters "M" (reliability value: 60%) and "N" (reliability value: 50%), but also the character "*" (reliability value: 30%). Since the preferred embodiment of the invention only processes further the recognised symbol with the highest reliability value, only the letters "M" and the reliability value 60% or 80% are read into the character sample storage part 100.

In step 210 in FIG. 3, the reliability values are allocated so-called confidence levels and match values, where all reliability values within a particular range of values acquire the same confidence level but a different match. Each reliability value has at least one confidence level assigned to it. In the preferred embodiment, six confidence levels are defined. These confidence levels and the associated reliability values are shown in Table 1.

TABLE 1

| Designation | Name | Reliability value range |
| --- | --- | --- |
| VL | Very low | 0–30 |
| L | Low | 15–45 |
| LM | Low/medium | 30–60 |
| MH | Medium/high | 45–75 |
| H | High | 60–90 |
| VH | Very high | 75–100 |

Figure 4:
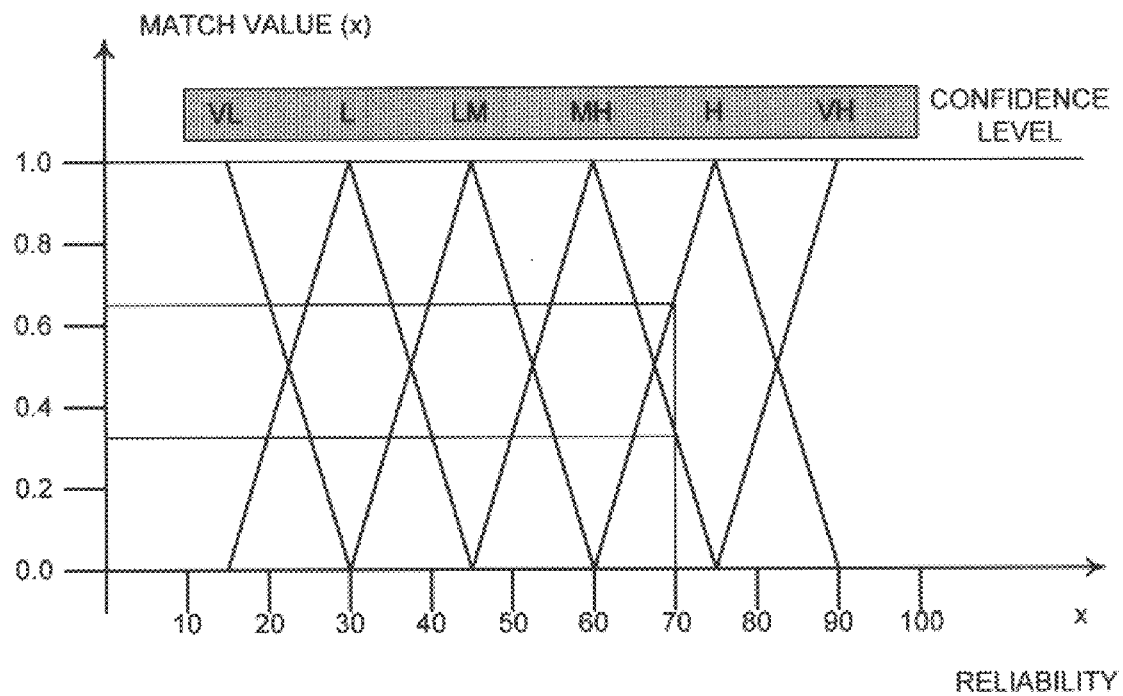
FIG. 4 is a diagram for calculating the match value from the reliability value supplied from the writing recognition units.

The ratio of the matches to the reliability values and the confidence levels is shown in FIG. 4. It can be seen from the table that the reliability value of 70% is associated with the confidence levels H and MH, since the value 70% falls into both confidence levels. FIG. 4 gives a value for the match for both confidence levels. For the confidence level MH, the reliability value of 70% has a match value of 0.25 and for the confidence level H it has a match value of 0.65. The match values are stored in the form of a sample vector in the sample vector memory part 120. For the above-mentioned example, a recognised character sample with the reliability value of 70% has the vector with the following form:

(0; 0; 0; 0.25; 0.65; 0;)

If the reliability value is greater than 90% or less than 10%, then the match is assigned a confidence level (VH or VL) with a value of 1.0. The sample vector would then have the following forms:

(0; 0; 0; 0; 0; 1) or (1; 0; 0; 0; 0; 0)

The relationship between the confidence levels, the matches and the reliabilities is laid down by the user of the writing recognition system and can be changed according to the experience acquired in order to improve the result of the writing recognition process. It is possible, for example, to set up curves in the form of a Gaussian distribution, instead of the triangular graphs shown in FIG. 4 for determining the match values. It is also possible to alter the size of the reliability value ranges for defining the confidence levels.

A further input value (Step 220), the so-called "recognition output value" or "RecoOut" value for the processor 50 is obtained from the results of the writing recognition units 30, 40. If the recognition results of the two writing recognition units 30, 40 are in agreement, the output recognition value (RecoOut) is set to a value of 1 (Step 230). If the recognition results do not agree, the recognition output value (RecoOut) is set to a value of 0 (Step 240). Three so-called "fuzzy sets" (unclear quantities) are thus obtained which serve as input for the process in accordance with the invention. The three quantities are:

i) Confidence level of the recognition unit 1 (termed variable "Conf1")

i) Confidence level of the recognition unit 2 (termed variable "Conf2")

iii) Agreement/non-agreement of the recognition units (termed variable "RecoOut")

The decision criterion of the method in accordance with the invention is complemented with rules which are stored in the rule data base 110. These rules will be drawn up by the programmer of the writing recognition system 10 and can be modified in the light of experience to improve the results of the process.

In the preferred embodiment of the invention more than 60 rules are stored in the rules data base 110. Table 2 shows nine rules by way of example, in order to clarify the structure of the rules.

TABLE 2

| | |
|---|---|
| a) | IF Conf1 EQ vl AND Conf2 EQ vh AND RecoOut EQ neq THEN vote = reco2 |
| b) | IF Conf1 EQ vh AND Conf2 EQ vl AND RecoOut EQ neq THEN vote = reco1 |
| c) | IF Conf1 EQ 1 AND Conf2 EQ vh AND RecoOut EQ eq THEN vote = reco2 |
| d) | IF Conf1 EQ mh AND Conf2 EQ h AND RecoOut EQ eq THEN vote = reco2 |
| e) | IF Conf1 EQ vl AND Conf2 EQ h AND RecoOut EQ neq THEN vote = reco2 |
| f) | IF Conf1 EQ 1 AND Conf2 EQ vl AND RecoOut EQ eq THEN vote = reject |
| g) | IF Conf1 EQ 1 AND Conf2 EQ 1 AND RecoOut EQ neq THEN vote = reject |
| h) | IF Conf1 EQ 1 AND Conf2 EQ h AND RecoOut EQ neq THEN vote = reject |
| i) | IF Conf1 EQ vl AND Conf2 EQ 1 AND RecoOut EQ eq THEN vote = reject |

The result of each rule is the variable "vote" which can assume one of three values, "reco1", "reco2" or "reject". The value "reco1" indicates that the first writing recognition unit 30 provides the most acceptable recognised symbol according to the result of this rule. The value "reco2" indicates that the second writing recognition unit 40 provides the most acceptable recognised symbol according to the result of this rule. The value "reject" indicates that neither of the two writing recognition units 30, 40 provides an acceptable recognised symbol according to the result of this rule.

In Step 250, the input values Conf1, Conf2 and RecoOut are evaluated with the aid of the rule data base 110. The input values were earlier represented in the sample vector memory part 120 as above in the form of a sample vector. The evaluation takes place in the processor 50 and the results, i.e. the variables "vote", are read into the rule result memory portion 125.

The rules a) and i) will serve as examples of this evaluation process. Rule a) states that the variable "vote" takes the value "Reco2" if the confidence limit of the result from the first writing recognition unit 30 is very low (VL) (i.e. reliability value below 30%—see FIG. 4) and the confidence limit of the second writing recognition unit 40 is very high (VH) (i.e. reliability value greater than 75%—see FIG. 4), provided that both writing recognition units 30, 40 recognise the same character (i.e. RecoOut is 1).

Rule i) states that the variable "vote" takes the value "Reject" if the confidence limit of the result from the first writing recognition unit 30 is very low (L) (sic) (i.e. reliability value below 30%—see FIG. 4) and the confidence limit of the second writing recognition unit 40 is low (L) (i.e. reliability value between 15% and 45%—see FIG. 4), even if both writing recognition units 30, 40 recognise the same character (i.e. RecoOut is 1).

In Step 260 the degree of fulfilment of each rule is calculated with the aid of a so-called inference method. Various inference methods are known and are described in the book "Fuzzy Vote" by H. -H. Boethe, Springer Verlag, Berlin, 1993. In the preferred embodiment, the so-called max.-min. inference method is selected.

According to this method, the match values of the input variables, Conf1 and Conf2, calculated in Step 210, are used to calculate a degree of fulfilment (or weight) of the rule. The degree of fulfilment of the rule then takes the lower of the two match values. Assuming that the variable Conf1 has a match value of 0.25 and the variable Conf2 a match value of 0.75, the degree of fulfilment of a rule which makes use of these two match values, is 0.25. In the degree of fulfilment table 135 in memory 60, the degree of fulfilment of each rule is stored together with the result of each rule.

In Step 270, the overall result of the writing recognition process is calculated. The degree of fulfilment values and the rule results stored in the degree of fulfilment table 135 are queried by the processor 50 and for each of the three possible values of the rule output variables, votes, i.e. the values "Reject", "Reco1" and "Reco2", the lowest degree of fulfilment is selected.

Thus, ever value "Reco1", "Reco2" and "Reject" is allocated a degree of fulfilment. It is found that one of these degrees of fulfilment is considerably greater than the other two degrees of fulfilment. The value with the highest degree of fulfilment will be selected as the overall result of the writing recognition process. Should the overall result be "Reco1", this means that the first writing recognition unit 30 has recognised the written character the most reliably. Should the overall result be "Reco2", this means that the second writing recognition unit 40 has recognised the written character the most reliably. Should the overall result be "Reject", this means that neither of the writing recognition units 30, 40 is in a position to supply an reliable result for recognition of the writing.

Figure 6A:
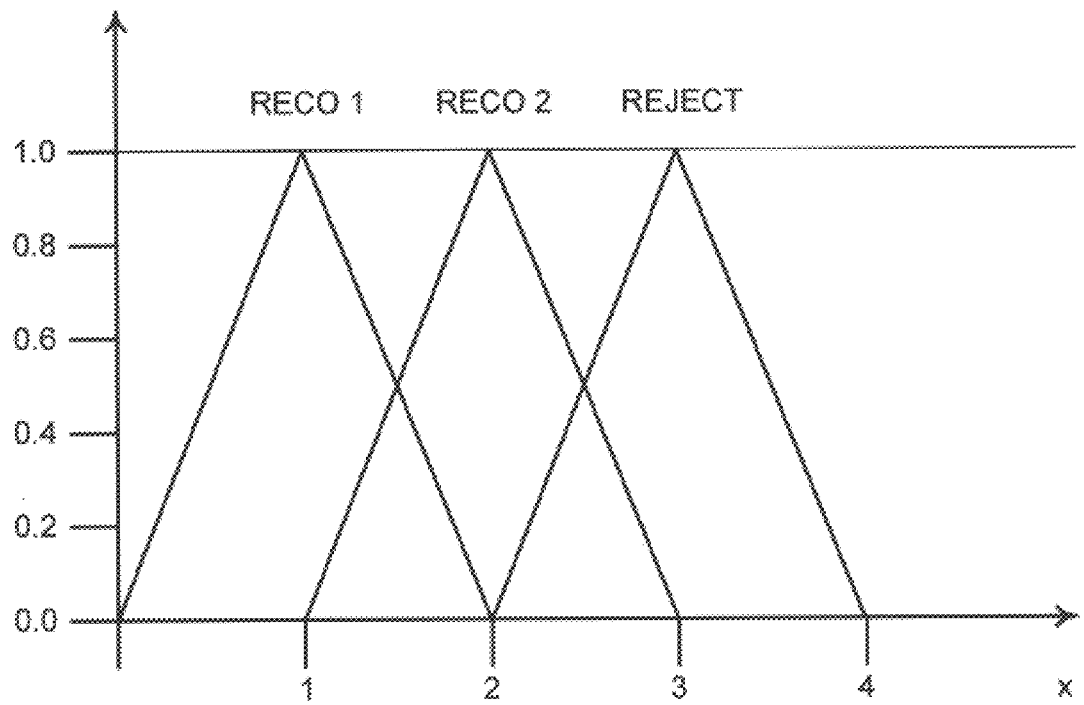
FIG. 6A is a graphical representation of the calculation of the degree of fulfilment.
Figure 6B:
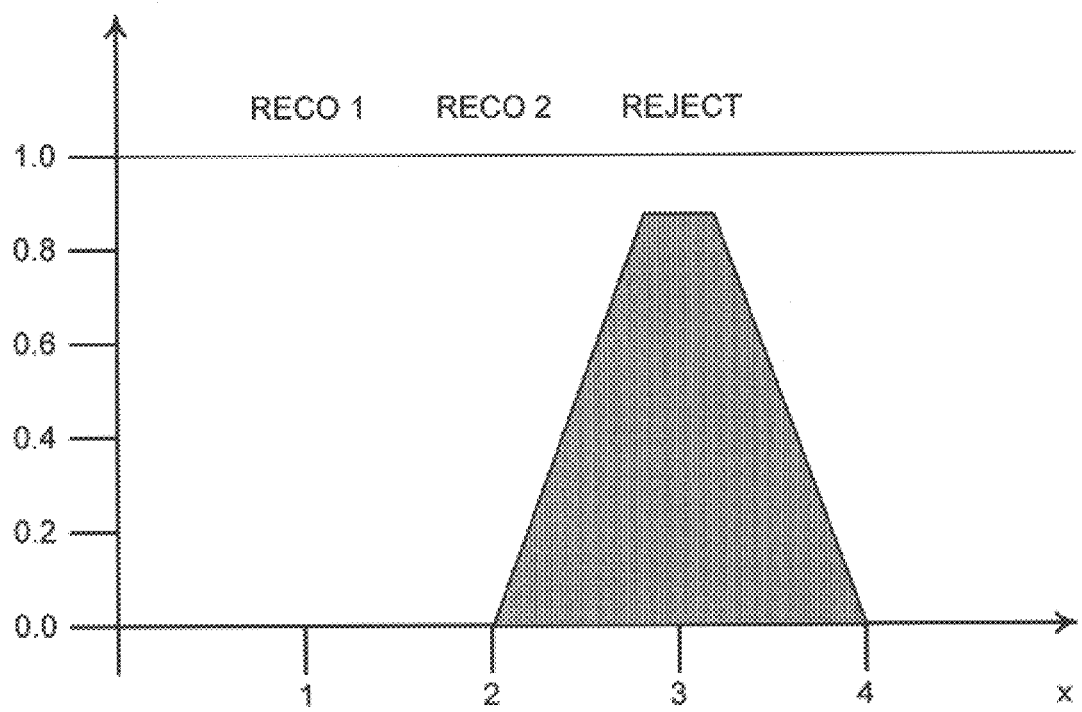
FIG. 6B is an example of the calculated degree of fulfilment.

This overall result is shown graphically in FIG. 6A. The variable "vote" can assume three values, "Reco1", "Reco2" or "Reject" and to each of these three values a degree of fulfilment (Y-axis) is assigned which can have a value between 0 and 1.0. FIG. 6B shows the result after running through the rule data base 110 and calculating the lowest degree of fulfilment for each value. In this case, the values "Reco1" and "Reco2" have so low a degree of fulfilment that they do not appear on the figure. The degree of fulfilment of the value "Reject" is considerably larger and the overall result of the novel writing recognition process "fuzzy vote" is consequently "Reject", i.e. none of the recognised symbols are reliable.

A simulation can show the advantage of the novel "fuzzy vote" writing recognition system over the known processes. Table 3 shows the results of the simulation.

TABLE 3

| | | | | | | | Col. | | | | | | | |
|---|---|---|---|---|---|---|---|---|---|---|---|---|---|---|
| Line | 1 Reco-Out | 2 C1 | 3 C2 | 4 Fuzz vote | 5 MW | 6 T1 | 7 Reco-Out | 8 C1 | 9 C2 | 10 Fuzz vote | 11 Sub vote | 12 MV | 13 T1 | 14 Sub T1 |
| 1 | 1 | 15 | 15 | R | R | R | 0 | 15 | 15 | R | | R | R | |
| 2 | 1 | 15 | 30 | R | R | R | 0 | 15 | 30 | R | | R | R | |
| 3 | 1 | 15 | 45 | 2 | R | R | 0 | 15 | 45 | R | | R | R | |
| 4 | 1 | 15 | 60 | 2 | 2 | R | 0 | 15 | 60 | R | | R | R | |
| 5 | 1 | 15 | 75 | 2 | 2 | R | 0 | 15 | 75 | R | .2 | R | R | |
| 6 | 1 | 15 | 90 | 2 | 2 | R | 0 | 15 | 90 | 2 | .17 | R | R | |
| 7 | 1 | 30 | 15 | R | R | R | 0 | 30 | 15 | 2 | | R | R | |
| 8 | 1 | 30 | 30 | 2 | R | R | 0 | 30 | 30 | R | | R | R | |
| 9 | 1 | 30 | 45 | 2 | R | R | 0 | 30 | 45 | R | | R | R | |
| 10 | 1 | 30 | 60 | 2 | 2 | R | 0 | 30 | 60 | R | | R | R | |
| 11 | 1 | 30 | 75 | 2 | 2 | R | 0 | 30 | 75 | R | | R | R | |
| 12 | 1 | 30 | 90 | 2 | 2 | R | 0 | 30 | 90 | R | .33 | R | R | |
| 13 | 1 | 45 | 15 | 1 | R | R | 0 | 45 | 15 | 2 | | R | R | |
| 14 | 1 | 45 | 30 | 1 | R | R | 0 | 45 | 30 | R | | R | R | |
| 15 | 1 | 45 | 45 | 1 | R | R | 0 | 45 | 45 | R | | R | R | |
| 16 | 1 | 45 | 60 | 2 | 2 | R | 0 | 45 | 60 | R | | R | R | |
| 17 | 1 | 45 | 75 | 2 | 2 | R | 0 | 45 | 75 | R | | R | R | |
| 18 | 1 | 45 | 90 | 2 | 2 | R | 0 | 45 | 90 | R | | R | R | |
| 19 | 1 | 60 | 15 | 1 | 1 | 1 | 0 | 60 | 15 | R | | R | 1 | .25 |
| 20 | 1 | 60 | 30 | 1 | 1 | 1 | 0 | 60 | 30 | R | | R | 1 | .50 |
| 21 | 1 | 60 | 45 | 1 | 1 | 1 | 0 | 60 | 45 | R | | R | 1 | .75 |
| 22 | 1 | 60 | 60 | 1 | 1 | 1 | 0 | 60 | 60 | R | | R | 1 | 1 |
| 23 | 1 | 60 | 75 | 2 | 1 | 1 | 0 | 60 | 75 | R | | R | 1 | 1 |
| 24 | 1 | 60 | 90 | 2 | 1 | 1 | 0 | 60 | 90 | R | | R | 1 | 1 |
| 25 | 1 | 75 | 15 | 1 | 1 | 1 | 0 | 75 | 15 | R | .2 | R | 1 | .2 |
| 26 | 1 | 75 | 30 | 1 | 1 | 1 | 0 | 75 | 30 | 1 | | R | 1 | .4 |
| 27 | 1 | 75 | 45 | 1 | 1 | 1 | 0 | 75 | 45 | R | | R | 1 | .6 |
| 28 | 1 | 75 | 60 | 1 | 1 | 1 | 0 | 75 | 60 | R | | R | 1 | .8 |
| 29 | 1 | 75 | 75 | 1 | 1 | 1 | 0 | 75 | 75 | R | | R | 1 | 1 |
| 30 | 1 | 75 | 90 | 2 | 1 | 1 | 0 | 75 | 90 | R | | R | 1 | 1 |
| 31 | 1 | 90 | 15 | 1 | 1 | 1 | 0 | 90 | 15 | R | .17 | R | 1 | .167 |
| 32 | 1 | 90 | 30 | 1 | 1 | 1 | 0 | 90 | 30 | 1 | .33 | R | 1 | .333 |
| 33 | 1 | 90 | 45 | 1 | 1 | 1 | 0 | 90 | 45 | 1 | | R | 1 | .5 |
| 34 | 1 | 90 | 60 | 1 | 1 | 1 | 0 | 90 | 60 | R | | R | 1 | .667 |
| 35 | 1 | 90 | 75 | 1 | 1 | 1 | 0 | 90 | 75 | R | | R | 1 | .833 |
| 36 | 1 | 90 | 90 | 1 | 1 | 1 | 0 | 90 | 90 | R R | | R | | 1 |
| 48 | Hits | | | 33 | 27 | 18 | | | | 6 | 1.4 | 0 | 18 | 12 |

The simulation was carried out for two cases. In the first case, it was assumed that the results of the first and second writing recognition units 30, 40 were the same, i.e. RecoOut is 1. These results are shown in columns 1–6 of Table 3. In the second case it was assumed that the result of the first and second writing recognition units 30, 40 were dissimilar, i.e. RecoOut is 0. These results are shown in columns 7–14 of Table 3. The columns 2 and 8 or 3 and 9 show the confidence limits for the first writing recognition unit 30 or the second writing recognition unit 40 respectively. The results of the "fuzzy vote" writing recognition process in accordance with the principle described herein are in columns 4 and 10. The results for a writing recognition process in which the results of the two writing recognition units are combined by the previously known multi-voting process are shown in columns 5 and 12. Columns 6 and 13 show the case where only one writing recognition unit is employed for the process. In the last case, all the results with a confidence level below 50% were rejected. The number of hits in line 48 gives the number of cases in which the result from one or other of the writing recognition units 30, 40 was used as the overall result of the process.

Columns 11 and 14 give the substitution values. These values show the probability of a faulty recognition of a character by the writing recognition process. Line 5 of column 11 indicates that there is a 20% chance that the second writing recognition unit 40 will not recognise the character correctly after expert knowledge. Line 22 of column 14 indicates that the single writing recognition unit 30 has with high certainty not correctly recognised the character according to expert opinion.

With the aid of Table 3 it is possible to compare the result of the writing recognition processes. The traditional process T, which makes use of a single writing recognition unit, has a hit rate (Columns 6 and 13) of (18+18)/22=50%. It must, however, be taken into account that the traditional process has an apparent substitution rate (Column 14) of 12/72= 16.76%. This process thus has an overall benefit of (50– 16.76)%=33.24%.

The "Multi-Voting" process has a hit rate (Columns 5 and 12) of (27+0)/72=37%. This is at the same time the total benefit, since there is no substitution in this simulation.

The "Fuzzy Vote" process in accordance with the invention has a hit rate (Columns 4 and 10) of (33+6)/72=39/72= 54.2%.

From this it is necessary to subtract the substitution rate (Column 11) of 1.4/72=1.96%. The overall result is thus 52.24%. From this simulation the improvement of the results in writing recognition method is therefore clear.

We claim:

1. An apparatus for recognizing written characters, comprising:

at least two writing recognition units, each of said writing recognition units generating recognition results corresponding to each recognized character, wherein each of the recognition results from each unit comprises at least one recognized symbol and a corresponding reliability value;

means for designating a recognition output parameter to each recognized character based on the corresponding recognition results, wherein the recognition output parameter for a given recognized character is designated as either a first value, if the corresponding recognition results of the at least two writing recognition units are in agreement, or a second value, if the corresponding recognition results of the at least two recognition units are not in agreement;

means for allocating at least one confidence level from a set of confidence levels to each recognized character based on the corresponding reliability values, wherein each of the confidence levels is defined by a predetermined range of reliability values;

means for allocating at least one match value for each confidence level allocated to each recognized character, wherein the match value represents the degree to which the confidence level matches the corresponding reliability value of a given recognized character;

means for generating a sample vector that represents a reliability value and confidence level variable for each of the corresponding recognition results for a given recognized character, wherein the sample vector comprises a plurality of elements each corresponding to one reliability value at one of the defined confidence levels, and wherein the at least one match value is stored in the element of the sample vector that corresponds to that confidence level; and evaluating means for evaluating the confidence levels and recognition output parameter associated with each recognized character using a plurality of rules to generate an overall recognition result for each recognized character based on output results of the rules.

2. A method for recognizing written characters, comprising the steps of:

recognizing written characters with at least two writing recognition units, each of said writing recognition units supplying recognition results corresponding to each recognized character, the recognition results comprising at least one recognized symbol and a corresponding reliability value;

allocating at least one confidence level for each of the recognized characters from a set of confidence levels based on the corresponding reliability values for said recognized characters, wherein each of the confidence levels is defined by a predetermined range of reliability values;

designating a recognition output parameter for each recognized character based on the corresponding recognition results, wherein the recognition output parameter for a given recognized character is designated as either a first value, if the corresponding recognition results of the at least two writing recognition units are in agreement, or a second value, if the corresponding recognition results of the at least two recognition units are not in agreement;

allocating at least one match value for each confidence level allocated to each recognized character, wherein the match value represents the degree to which the confidence level matches the corresponding reliability value of a given recognized character;

generating a sample vector that represents a reliability value and confidence level variable for each of the corresponding recognition results for a given recognized character, wherein the sample vector comprises a plurality of elements each corresponding to one reliability value at one of the defined confidence levels, and wherein the at least one match value is stored in the element of the sample vector that corresponds to that confidence level;

evaluating a plurality of rules for each of said recognized characters with the corresponding confidence levels and recognition output parameters; and generating an overall recognition result for each recognized character based on output results of the rules.

3. The apparatus of claim 1, further comprising means for calculating a degree of fulfillment for each of the plurality of rules that produce an output results, wherein the degree of fulfillment for a given rule is computed based on the match values of the confidence levels that are evaluated with the given rule.

4. The apparatus of claim 1, further comprising means for assigning to each of the plurality of rules that produce an output result, a degree of fulfilment that is equal to the lowest value of the match values of the confidence levels that are evaluated with the given rule.

5. The apparatus of claim 3, further comprising a degree of fulfillment table for storing the degree of fulfilment and corresponding output result for each rule.

6. The apparatus of claim 3, wherein the evaluation means selects, as the overall recognition result for a recognized character, the output result of the rule having the highest degree of fulfillment.

7. The apparatus of claim 1, wherein the output result of each of the plurality of rules is a variable that is one of a value indicating that a particular one of the at least two recognition units provides the most acceptable recognized symbol according to the given rule and a value indicating that none of the at least two recognition units provides an acceptable recognized symbol according to the rule.

8. The apparatus of claim 1, wherein the sample vectors are used as input variables by the evaluation means.

9. The method of claim 2, further comprising the step of calculating a degree of fulfillment for each of the plurality of rules that produce an output result, wherein the degree of fulfillment for a given rule is computed based on the match values of the confidence levels that are evaluated with the given rule.

10. The method of claim 2, further comprising the step of assigning to each of the plurality of rules that produce an output result a degree of fulfilment that is equal to the lowest value of the match values of the confidence levels that are evaluated with the given rule.

11. The method of claim 9, wherein the step of evaluating comprises the step of selecting, as the overall recognition result for a recognized character, the output result of the rule having the highest degree of fulfillment.

12. A program storage device readable by a machine, tangibly embodying a program of instructions executable by the machine to perform method steps for recognizing written characters, the method comprising the steps of:

recognizing written characters with at least two writing recognition units, each of said writing recognition units supplying recognition results corresponding to each recognized character, the recognition results comprising at least one recognized symbol and a corresponding reliability value;

allocating at least one confidence level for each of the recognized characters from a set of confidence levels based on the corresponding reliability values for said recognized characters, wherein each of the confidence levels is defined by a predetermined range of reliability values;

designating a recognition output parameter for each recognized character based on the corresponding recognition results, wherein the recognition output parameter for a given recognized character is designated as either a first value, if the corresponding recognition results of the at least two writing recognition units are in agreement, or a second value, if the corresponding recognition results of the at least two recognition units are not in agreement;

allocating at least one match value for each confidence level allocated to each recognized character, wherein the match value represents the degree to which the confidence level matches the corresponding reliability value of a given recognized character;

generating a sample vector that represents a reliability value and confidence level variable for each of the corresponding recognition results for a given recognized character, wherein the sample vector comprises a plurality of elements each corresponding to one reliability value at one of the defined confidence levels, and wherein the at least one match value is stored in the element of the sample vector that corresponds to that confidence level;

evaluating a plurality of rules for each of said recognized character with the corresponding confidence levels and recognition output parameters; and generating an overall recognition result for each recognized character based on output results of the rules.

13. The program storage device of claim 12, further comprising instructions for performing the step of calculating a degree of fulfillment for each of the plurality of rules that produce an output result, wherein the degree of fulfillment for a given rule is computed based on the match values of the confidence levels that are evaluated with the given rule.

14. The program storage device of claim 12, further comprising instructions for performing the step of assigning to each of the plurality of rules that produce an output result, a degree of fulfilment that is equal to the lowest value of the match values of the confidence levels that are evaluated with the given rule.

15. The program storage device of claim 13, wherein the instructions for performing the step of evaluating comprise instructions for performing the step of selecting, as the overall recognition result for a recognized character, the output result of the rule having the highest degree of fulfillment.

* * * * *